United States Patent [19]
Colin et al.

[11] Patent Number: 4,978,539
[45] Date of Patent: Dec. 18, 1990

[54] PROCESS FOR OBTAINING ALCOHOLIC BEVERAGES FROM VEGETAL JUICE

[75] Inventors: Gerard Colin, St Emilion; Michael Conroy, Cenac, both of France

[73] Assignee: La Compagnie Viticole et Fermiere Edmond et Benjamin de Rothschild S.A., Geneva, Switzerland

[21] Appl. No.: 261,828
[22] PCT Filed: Dec. 30, 1987
[86] PCT No.: PCT/FR87/00523
    § 371 Date: Aug. 29, 1988
    § 102(e) Date: Aug. 29, 1988
[87] PCT Pub. No.: WO88/05084
    PCT Pub. Date: Jul. 14, 1988

[30] Foreign Application Priority Data
    Jan. 9, 1987 [FR] France .................................. 87 00232

[51] Int. Cl.$^5$ ......................... C12C 11/00; C12G 1/00
[52] U.S. Cl. ........................................... 426/11; 426/15
[58] Field of Search ..................................... 426/11, 15

[56] References Cited

U.S. PATENT DOCUMENTS

| | | | |
|---|---|---|---|
| 3,979,521 | 9/1976 | Sakaguchi et al. .................... | 426/15 |
| 4,326,036 | 4/1982 | Hayes .................................. | 425/161 |
| 4,361,651 | 11/1982 | Keim .................................. | 435/161 |
| 4,784,859 | 11/1988 | Lasley .................................. | 426/11 |

FOREIGN PATENT DOCUMENTS

| | | |
|---|---|---|
| 2060688 | 5/1981 | United Kingdom . |
| 2085469 | 4/1982 | United Kingdom . |

OTHER PUBLICATIONS

Lee et al.; "Membrane Separation in Alcohol Production", *Annals of the New York Academy of Sciences*, vol. 369, 1981. Biochemical Engineering II (N.Y., U.S.A.), pp. 367–381, see pp. 367–368.

Serrano et al.; "Use of Tangential Microfilters in Enology". *Chemical Abstracts*, vol. 101, No. 17, Oct., 1984, p. 558, 149718b, & Connaissance, Vigne Vin 1984, 18 (2), 135–154.

Ting Shiang Lee et al.: "Membrane Separation in Alcohol Production", Annals of the New-York Academy of Sciences, vol. 369, 1981, Biochemical Engineering II (New York, U.S.A.), pp. 367–381, see pp. 367–368.

M. Serrano et al.: "Use of Tangential Microfilters in Enology", Chemical Abstracts, vol. 101, No. 17, Oct. 22, 1984, see p. 558, 149718b, & Connaissance, Vigne Vin 1984, 18 (2), 135–54.

G. Troost: "Technologie des Weines", 5e édition, 1980, Verlag E. Ulmer (Stuttgart, DE), pp. 152–154, voir p. 153, dernier alinéa –p. 154, alinéa 3.

Szilveszter Bergendy, "Sugar Cane and Fruits", pp. 11–14.

*Primary Examiner*—Donald E. Czaja
*Assistant Examiner*—Helen Pratt
*Attorney, Agent, or Firm*—Young & Thompson

[57] ABSTRACT

This process consists in taking vegetal juice obtained by pressing at least one vegetal substance, adjusting its pH before sulfiting it, clarifying it, then subjecting it to microfiltration through a membrane. The microfiltered juice is subjected to controlled alcoholic fermentation in a carbon dioxide atmosphere. This process results in new alcoholic drinks having very pleasant organoleptic properties. An installation for industrially carrying out the process applied to cane sugar results in cane wine and pure cane spirit.

15 Claims, 1 Drawing Sheet

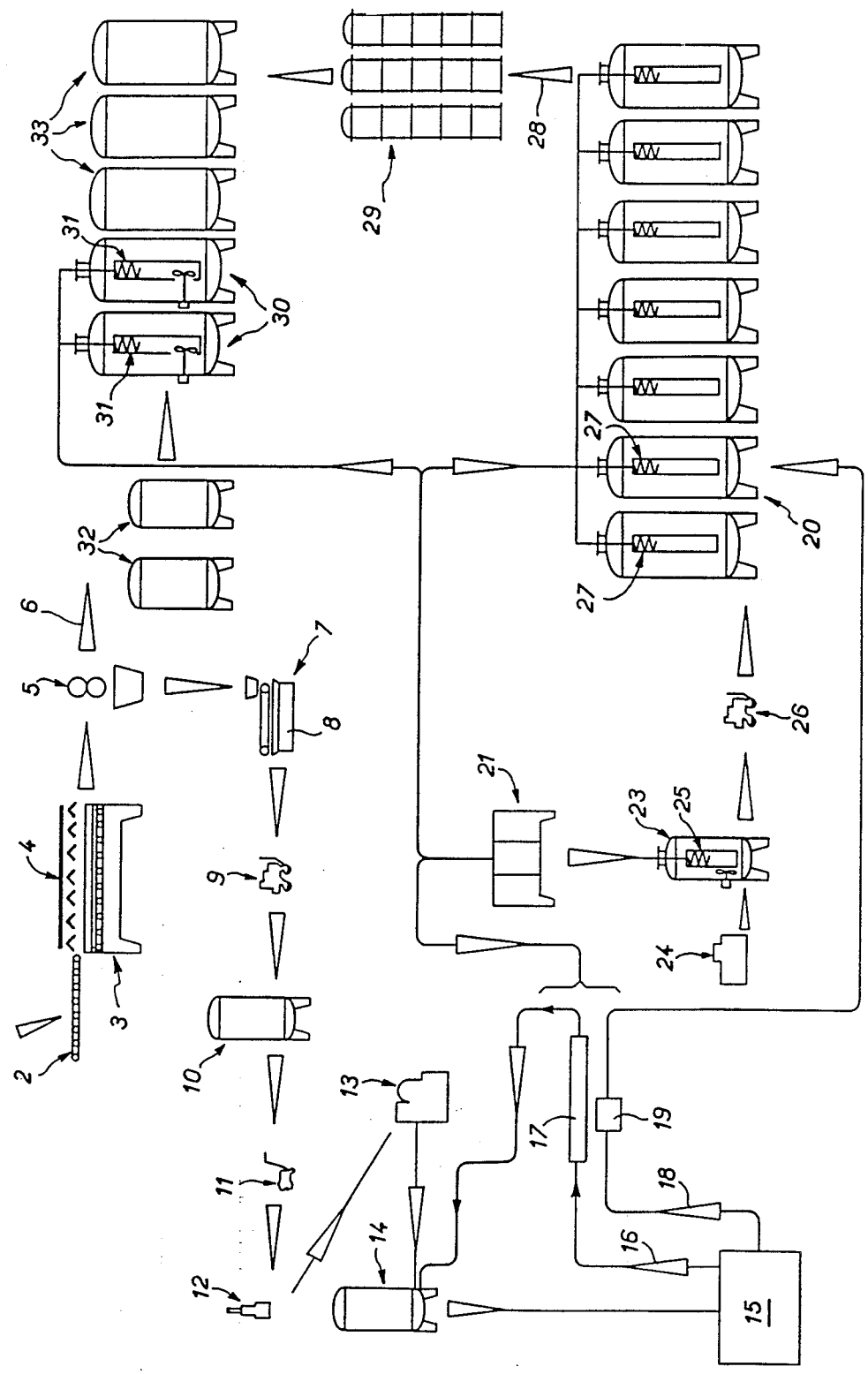

PROCESS FOR OBTAINING ALCOHOLIC BEVERAGES FROM VEGETAL JUICE

The invention relates to a process for obtaining alcoholic beverages from vegetal juice obtained from at least one vegetal substance.

The vegetal juice most widely used to obtain an alcoholic beverage by alcoholic fermentation is grape juice.

Vinification consists of the set of the techniques used to transform grapes into wine.

Following the harvest grapes are taken to the cellar or stilling room where they undergo a number of successive different procedures according to whether it is wished to obtain a red, white or rose wine. The vinification operations can be classified into three parts: mechanical processing of the harvest; fermentation; preservation and ageing of the wine.

The purpose of the mechanical processing of the harvest is, in the case of vinification of white wine, that of reducing exchanges between solid matters (stalks, skins, pits) and the liquid. Thus, in order to obtain a white wine, white or black grapes are taken to the cellar and are pressed immediately after optionally passing through the wine press and stalk removing machine. The slightly sulfited must can undergo the operation of washing before commencing fermentation.

Washing consists in the removing of the large size impurities (earth, organic debris) from the must before fermentation. This means that the juice obtained in this way can contain solids in suspension before fermentation. Another vegetal juice which is highly used to obtain an alcoholic beverage is cane juice obtained by pressing and extraction of sugar cane with water. This diluted juice which contains approximately 70 g. of sugar per liter, is fermented, and then distilled, and reduced in order to give agricultural rums.

All these rums have the particular feature of a relatively high content of non alcohols. The non-alcohols consist conventionally, of all volatile substances other than ethanol such as, for example, aldehydes, esters, higher alcohols, furfural, volatile acidity, etc. even so-called light rums have a non-alcohol content which is always greater than 60 g. per hectolitre of pure alcohol in accordance with current French regulations.

As distinguished from grape juice, up to now cane juice has not been fermented as is with a view to obtaining in an industrial manner a directly consumable wine containing 10 to 11% by volume ethanol.

Finally there are other vegetal juices such as juice from green vegetables, citrus fruits and sundry fruits such as melons, apricots, mangoes, pineapples, which, although very rich in aromas, are not used for the production of wine by fermentation of their juices because up to the present this has not been mastered and because it lead to bacterial production to the detriment of alcoholic fermentation by yeasts. However, the latter juices are used as non-fermented beverages.

So, as the present time, there are channels for the utilization of vegetal juices which are quite separate one from the one other. The purpose of the present invention is to create a new field which, starting from a vegetal juice sufficiently rich in sugar, can produce new alcoholic beverages. The term vegetal juice is understood to mean, for example, a juice obtained by a single vegetal substance, for example, sugar cane or a juice obtained by a combination of several vegetal substances for example sugar cane and grapefruit, sugar cane and pineapple, grapes and one or more vegetal substances, etc.

The term new alcoholic beverage is understood to mean a beverage having new and desirable organoleptic properties for a statistically significant sample of consumers.

In the field of wine making it is still impossible to characterize wines by their compositions because they are too complex. In fact, some five hundred different components have been identified in a grape wine.

Thus the solution to this problem posed results in an improved process for obtaining alcoholic beverages from a vegetal juice naturally containing at least a fermentable sugar comprising the following steps:

(a) providing a vegetal juice, obtained by pressing at least one vegetal substance in such a way that the content in fermentable sugars of the vegetal juice is between 80 and 230 g/liter, adjusting the pH between 3.5 and 4.3 before sulfiting it and then clarifying by eliminating all matter in suspension of a size greater than 1 mm;

(b) subjecting, the clarified juice to micro-filtration through a membrane with a porosity within the range of 0.2 to 0.45 $\mu$m and dividing it into two parts: a major part and a minor part;

(c) forming leaven with the minor part by aerobic culturing of a selected yeast;

(d) adding the leaven to the major part of the microfiltered juice and carrying and alcoholic fermentation between 20° and 28° C., in a carbon dioxide atmosphere.

This process has the advantage that it can be strictly controlled and therefore admits of good reproducibility. The pH is kept at the values given above, preferably by the addition of one or several organic acids commonly used in foodstuffs or by addition of a highly acid fruit juice in particular lemon or grapefruit juice. The microfiltration through a membrane having a porosity within the range of 0.2 to 0.45 $\mu$m is one of the essential means of the process. After this microfiltration the juice is free from solid particles in suspension.

This absence of solid particles in the filtrate results in an alcoholic beverage having new organoleptic properties. In fact, a major part of the aromatic compounds seem to be linked to the cellular fibres eliminated by micro-filtration.

Futhermore, juices of every composition can be achieved after pressing their respective vegetal substances, which makes it possible to develop new organoleptic properties solely from the constituents which pass through a membrane having a porosity within the range of 0.2 to 0.45 $\mu$m. This is of considerable interest in so far as sugar cane juice is concerned because the major part of the fairly large aromatic compounds attached to the cellular walls of the cane do not pass into the filtrate. The components of the filtrate are, if necessary, converted under the action of the yeasts into compounds which provide their particular influence on the beverage obtained.

Furthermore, microfiltration with a membrane having a porosity of 0.2 $\mu$m has the property of eliminating all endogenous yeasts and bacteria from the filtrate, thus producing a sterile vegetal juice. This porosity of 0.2 $\mu$m is therefore in the process of the invention preferred to any other porosity of greater size.

However, it is also possible to use a membrane of a porosity of 0.45 $\mu$m which allows some microorganisms, particularly small bacteria, to pass into the filtrate.

This is not a handicap since microorganisms which are few in number are inhibited by the acidic pH of the medium and by the presence of sulfure dioxide. By way of additional precaution it is possible to cool the major part of the filtrate while awaiting the seeding by the leaven. This major part is then reheated just before the leaven is added. This addition brings about a sudden and enormous increase in the population of selected yeasts which continue to inhibit the few microorganisms which from then are a small minority.

Thus, the result obtained from the organoleptic standpoint, according to the process of the invention where one obtains aromatic compounds and savouriness, in particular acidity, bitterness, sweetness and saltiness, specific to each vegetal substance, is different from that which one would obtain by the addition of aromatic extracts of vegetal substances to a juice after fermentation thereof.

Provided that the fermentable sugar content is sufficient, alcoholic fermentation can be carried to attain an alcohol proof between 2% and 14% ethanol by volume, limits included.

A certain content x of fermentable sugar can lead to a content Y % by volume of alcohol if the anaerobic fermentation yeasts are not lacking in vitamins and in nitrogenous substances. Where necessary biotin and ammonium salts can be added to the juice before fermentation. Fermentation can be arrested between 2 vol % and Y vol % by elimination of the fermentation yeasts or by pasturisation.

In order not to have uncontrolled losses of aroma and/or uncontrolled metabolism of yeasts during fermentation, fermentation takes place in a closed or sealed vat at at fermentation temperature preferably controlled between 20° and 28° C.

The sealed vat makes it possible to keep at least part of the carbon dioxide which has been formed, in solution in the beverage which is thus sparkling.

The general process of the invention where the vegetal juice comprises a juice obtained by pressing sugar cane and where fermentation is carried out until it runs to its natural completion yields an alcoholic beverage of 10 to 11% by volume of the white wine type, with a low proportion of non-alcohols and which can be advantageously subjected to distillation fractionation to yield an alcohol of between 92 and 96 vol %, with a non-alcohol content less than approximately 40 g per hectolitre of pure alcohol. By reduction of this alcohol a pure and natural sugar cane spirit is obtained which has new and very pleasant organoleptic properties while retaining a very low content in non-alcohols even as compared with a light rum.

The features and advantages of the invention will also be brought in the description of examples of embodiments where Example 5 will be described in reference to the attached drawing which illustrates an installation using the process according to the invention.

EXAMPLE 1

Preparation of sugar cane wine.

The sugar cane, washed and dried beforehand, is pressed by means of one single set of rollers to obtain a juice having a specific gravity of 1.075 containing 175 g of fermentable sugars per litre with a pH of 4.85. (By convention the specific gravity of the juice is compared to that of pure water considered 1,000).

11 hl of this juice is drawn off and its pH is lowered to 4.21 by the addition of 275 g of citric acid and 275 g of tartaric acid.

The juice is protected against oxidation and microbial adulteration before clarification by adding 55 g of sulfur dioxide. The juice is then centrifuged by means of a centrifuger having a flow rate of 15 hl/hour to eliminate any material in suspension of a size greater that 1 mm, the resulting juice undergoing tangential microfiltration on a mineral membrane of a porosity of 0.2 $\mu$m using IMECA apparatus, with a microfiltration flow rate of 10 hl/hour.

A minor part of 2 hl of this microfiltered juice is then tapped and seeded with 40 g of Saccharomyces cerevisiae yeast containing $4 \times 10^6$ yeast per cm$^3$. When the leaven has a yeast concentration of between $10^7$ and $10^8$ yeast units per cm$^3$ and when the yeast population is in the growth phase it is added to the major part of 9 hl microfiltered juice stored in the meantime in sterile conditions. The volume of the yeast added represents approximately 22% of the volume of the major part of the microfiltered juice.

(Instead of 22%, any value between 10 and 25% can be used as ratio of volume of yeast added to that of the major part). 275 g of ammonium phosphate is then added.

The fermentation phase proper then begins in a thermostatically controlled vat so that the temperature of the medium remains between 20° and 28° C. until the depletion of the fermentable sugars. Alcoholic fermentation is thus carried out until its natural completion.

The closed, unsealed vat has made enably a $CO_2$ atmosphere to be maintained on the surface of the must.

Metering of the sugars clearly indicates that the fermentation could not continue. About 88 g sulfur dioxide is then added to stabilize this alcoholic beverage against the risks of oxidization and bacterial deterioration.

The analysis of this product yields the following results:

pH=3.57
Alcoholmetric strength 11.6 vol. %
Absence of lactic acid
Volatile acidity equivalent to 0.27 g/l of $H_2SO_4$

EXAMPLE 2

Preparation of an alcoholic beverage from sugar cane juice and lime juice.

A juice resulting from pressing sugar cane identical to that of Example 1 (i.e. a specific gravity 1.075, pH 4.85 and containing 175 g fermentable sugars per liter) is acidified to pH 4.3 by the addition of lime juice in a quantity of 0.5 l. per hectoliter of cane juice. The resulting juice is then subjected precisely to the same process as in Example 1.

The analysis of the product obtained gave the following results:

pH=3.39
alcoholmetric strength 11 vol. %
Absence of lactic acid.
Volatile acidity equivalent to 0.18 g/l of $H_2SO_4$.

EXAMPLE 3

Preparation of an alcoholic beverage from cane and grapefruit juice.

Previously washed and dried sugar cane is pressed using one single set of rollers to obtain juice having a specific gravity of 1.075, containing 175 g of fermentable sugar per liter and a pH of 4.85. The juice is then acidified with citric acid (25 g/hl of juice) and tartaric acid (25 g/hl of juice) to a pH of 4.21. 5% juice of a fresh pressed whole grapefruit is then added (volume percentage in relation to the volume of sugar cane juice). This admixture lowers the pH to 3.85. Sulfur dioxide is then added in the proportion of 5 g/hl of the juice. The resulting juice is clarified and microfiltered through a filter having porosity equal to 2 μm. The microfiltered juice is divided into a minor part and a major part. The minor part is used for the preparation of a leaven using Saccharomyces cerevisiae. This leaven, when its concentration reaches $5 \times 10^7$ yeast per cm$^3$ is added to the major part and fermentation is carried out in a closed vat until depletion of the fermentable sugars. The analysis of the product obtained after the cessation of fermentation yielded the following results:

pH = 3.38
alcoholmetric strength 10.8 vol. %
volatile acidity equivalent to 0.18 g/l of $H_2SO_4$.

This beverage is stabilised with 8 g of sulfur dioxide per hectoliter. It then has very typical organoleptic properties: aromas of grapefruit and a certain bitterness in the mouth.

EXAMPLE 4

Preparation of alcoholic beverages from melon juice.

Peeled melons are pressed to obtain 12 liters of juice. This juice has the following composition:

Fructose 15 g/l, glucose 11 g/l, saccharose 57 g/l (that is a total of 83 g of fermentable sugars).

The juice is acidified with 1.5 g/l of citric acid and 1.5 g/l of tartaric acid. The pH is then 4.30. 50 mg/l of sulfure dioxide is then added before clarifying it through a 0.3 mm filter. The resulting clarified juice is filtered through a 10 mm membrane then microfiltered through a 0.2 μm membrane. The microfiltered juice is frozen at $-4°$ C. as supplementary precaution, except for 3 liters which are used for preparation of the leaven. 600 mg of dry Saccharomyces cerevisiae yeast are then added to these three liters. On the following day the population of yeast is in the growth phase and reaches $10^8$ yeast par cm$^3$. The yeast is then added to the major part (9 liters) of unfrozen juice heated back to 20° C. and it all is then left to ferment at 20° C. for two days in a carbon dioxide atmosphere. A 15 liter glass tank with a bubbler is used for such fermentation in order to maintain a $CO_2$ atmosphere above the juice.

When the juice has reached a specific gravity of 1.010 a fraction A of 4 liters is then drawn off and immediately pasturised in such a way as to stop the alcoholic fermentation. The remainder of the juice, that is fraction B, naturally completes its fermentation. 80 mg/l of $SO_2$ are then added.

The products thus obtained have the following compositions:

Fraction A. Not totally fermented beverage.
pH = 4.10
Alcoholmetric strength = 2.8 vol. %
Fermentable sugars = 38 g/l
Volatile acidity equivalent to 0.15 g/l of $H_2SO_4$
Fraction B. Beverage totally fermented.
pH = 4.02
Alcoholmetric strength = 5.0 vol. %
Fermentable sugars less than 1 g/l.
Volatile acidity equivalent to 0.20 g/l of $H_2SO_4$.

EXAMPLE 5

Referring to the drawing, one notes a flow diagram of an installation for carrying out the process in accordance with the invention.

Sugar cane is cut by hand, without having recourse to the technique of preliminary leaf stripping by burning in order to prevent any physical damage to the stem such as crushing or any damage whatsoever which could permit contamination of the inside of the sugar cane by microorganisms.

The stems are, preferably after transport to the installation site, stripped of leaves, cut to a length of approximately 1.20 m and placed on preparation table 2.

Table 2 is a stainles steel chain and bar conveyor the purpose of which is to convey the sugar cane stems to a washing table 3 consisting of a horizontal open-work conveyor above which there are potable water spraying nozzles. The washing is intended to remove sundry dirt and particles of earth from the stems.

After the washing the sugar cane stems undergo extraction of the juice by passage through one single roller mill 5. A first pressing juice of a specific gravity of about 1.080 and a high proportion of fermentable sugars (188 g/l) is thus obtained.

It should be noted that, between washing and passage into mill 5 the sugar cane stems may where appropriate undergo drying.

The bagasses leaving mill 5 are not recycled in order to exhaust them but evacuated at 6.

The juice obtained by pressing at 5 is therefore pure cane juice which then undergoes clarification in several stages. It then undergoes screening in a separator system 7 with tubed screw and trough for recovery of solids. The juice passes through a screen with oblong meshes about $2 \times 15$ mm and is collected in vat 8 placed under separator 7.

A pH measurement probe is placed in vat 8 and allows selection of the juices. In fact only juices having a pH of between about 5.2 and about 5.4 will be accepted, outside these limits the juice will be eliminated and the upstream installation will be stopped. In fact it is considered that above a pH of 5.4 or below a pH of 5.2 is the sign of deterioration or adulteration of the juice.

On leaving separator 7 the juice is conveyed by piston pump 9 to an intermediate storage tank 10. Pump 9 also serves to eliminate the juice considered to be unsuitable according to the indications of the above mentioned pH measurement probe. For that purpose pump 9 is equipped at the delivery side with a T coupling with valves allowing for the selection of the juices according to their pH.

An adjustment or regulation of the pH between 3.5 and 4.3 is effected between pump 9 and tank 10 and also sulfiting by means of sulfur dioxide to protect the juice against a permature start of fermentation. The $SO_2$ acts both as an anti-oxidizing agent and an antibiotic.

The adjustment of the pH takes place with the help of another acid juice such as lemon juice or orange or grapefruit juice or by the addition of citric and tartaric acids.

When it exits tank 10 the juice is taken up and conveyed by centrifugal pump 11 via separator 12 to centrifuger 13. This centrifuger can be of the Westfalia brand type SA 20 60 076 with a bowl speed of 6500 rpm.

The function of separator 12 through effecting a new screening of the juice is that of protecting centrifuger 13. Separator 12 is, in this case, an automatic vertical bowl cleaner equipped with an autoclave screen head with a scraped surface, consisting of a grill having a 0.9 m mesh. Any material in suspension of a size greater than 1 mm is thus eliminated.

The role of centrifuger 13 is that of conveying a clarified juice to a tangential filtration device 15 through a mineral membrane having a porosity equal to 0.2 μm.

This device 15 can be an IMECA semi-closed loop unit with pressure control and filtration system and batch washing.

Device 15 comprises four loops of two casings in series. Each casing contains 19 membranes having a porosity of 0.2 μm and a total area of 30.4 m². The average intake flow rate is 50 hl/h.

Centrifuger 13 conveys the cleaned juices direct to a storage tank 14.

Centrifuger 13 in this case is a hydro-cyclone water pressurizer.

The residue outlet 16 on the tangential filtration device 15 passes to a heat exchanger 17 but the filtrate from outlet 18 passes to a second heat exchanger 19 and is conveyed to a battery 20 of closed fermentation tanks.

Exchangers 17 and 19 are fed cooled by a cooling installation 21.

As the tangential filtration heats the juices, the function of exchangers 17 and 19 is to refrigerate the residues and the filtrates.

The conveyance of the residues into vat 14 via exchanger 17 makes it possible where necessary to retain the juice in vat 14 at a temperature less than about 25° C.

Thus one obtains, at the inlet to vats 20, a clear cane sugar juice which is sterile since it is free of any yeast, bacteria and particles in excess of 0.2 μm.

This remarkable quality of controlled purity of the cane juice is essential in the process of the invention because it is this which then permits, thanks to seeding solely by selected exogenous yeast strains, the desired final product is obtained. The strain Saccharomyces Cerevisiae of INRA-Narbonne-CBS 6978 origin with a guaranteed viable population of $25 \times 10^9$ cells/g (Fermivin-Societe Rapidase 59113 Seclin-France) was selected as the yeast.

It is possible to select other yeasts from those which are marketed such as for example a different strain of Saccharomyces cerevisiae or Schizosaccharomyces pombe.

The juice enters tanks 20 at approximately 18° C.

Seeding takes place as follows: a leaven is prepared in a tank 23 known as the yeasting tank.

For that purpose the juice intended for tanks 20 is drawn and conveyed to yeasting tank 23. The selected yeasts are introduced into tank 23 by a multiple dispenser 24.

Tank 23 is equipped with a stirrer, an air injection head in the middle of the yeast to insure aerobic conditions and a heat exchanger 25 connected to the cooling station 21 so that the aerobic culture takes place at a temperature between 20° and 28° C.

The multiple dispenser 24 also serves to adjust the pH of the leaven and to carry out any admixtures, for example of nitrogenous materials.

The stirring and oxygenation which take place in tank 23 allow the yeasts to multiply. This multiplication can be controlled numerically under a microscope.

The yeast is prepared approximately 24 hours before its injection in to closed tanks 20. Preferably this injection is effected when the population of the yeasts is in the growth phase.

The yeast is conveyed by a piston pump 26 into each tank filled with microfiltered juice at the rate of 10 to 25% by volume of that of the microfiltered juice.

Tanks 20 are each equipped with sections of plate exchangers 27 linked to the cooling unit 21 and allowing strict control of the preferential fermentation temperatures within the range of 20° to 28° C.

Some of the tanks 20 are not filled with fermentable microfiltered juice but are used for drawing off from tanks 20 where fermentation takes place.

Between of the two above-mentioned groups of tanks 20 one can advantageously carry out centrifuging on the fermented juice to eliminate dead yeast. This centrifuging can be followed by tangential microfiltration on a membrane having a porosity of 0.2 μm to remove the last traces of yeast and any deposits.

At exit 28 from the tank unit there is a clear cane wine having a percentage of about 10 to 11 vol. %.

The temperature of this cane wine is, at the outlet from the tank, of the order of 18° C. in order to prevent bacterial attack.

This cane wine is conveyed into a distillation and factionating unit 29 of a type which is known per se.

This unit is controlled in order to obtain, for example, two types of alcohol one at 96 vol. % with a maximum non-alcohol content of 9 g per hectolitre of pure alcohol and the other of 94 vol. % with a non-alcohol content between 10 and 15 g per hectolitre of pure alcohol.

The alcohol, fractionated in this way, is then directed towards two blending tanks 30 each equipped with a plate exchanger section 31 connected to cooling station 21 intended to limit increases in temperature which occurs during blending with the water supplied by tanks 32.

The water comes from an anionic and cationic resin demineralization unit (Parent Industrie). This water has a resistivity of 200,000 ohms/cm²/cm.

The blending converts the above-mentioned rectified alcohols into beverages of a strength of 40 vol. %. These beverages are stored in tanks 33. They have very pleasant organoleptic properties while having physiological properties which are essentially due to their ethanol content.

We claim:

1. In a process for obtaining alcoholic beverages from a vegetal juice naturally containing a sufficient content of at least one fermentable sugar, comprising pressing a vegetal substance and collecting a juice having a fermentable sugar content of between 80 and 230 g/liter, adjusting the pH of said juice between 3.5 and 4.3, sulfiting and clarifying the resulting juice by eliminating substantially all solid matter in suspension by filtration, adding a leaven to at least a part of the filtrate resulting from said filtration, effecting an alcoholic fermentation between 20° and 28° C. in a carbon dioxide atmosphere and recovering the product resulting from said fermentation, the improvement wherein said filtration comprises at least two successive filtration operations comprising a first filtration operation for removing solid matter in suspension of a size greater than 1 mm and a second filtration operation by microfiltration with a filtrating membrane having a porosity within the range of 0.2 to 0.4 μm thereby obtaining a sterile alcoholic beverage having a very low non-alcohol content as well as desirable organoleptic properties.

2. In a process for obtaining alcoholic beverages from a vegetal juice naturally containing a sufficient content of at least one fermentable sugar, comprising pressing a vegetal substance selected from the group consisting of sugar cane, grapefruit, pineapple, grapes and mixtures thereof and collecting a juice having a fermentable sugar content of between 80 and 230 g/liter, adjusting the pH of said juice between 3.5 and 4.3, sulfiting and clarifying the resulting juice by eliminating substantially all solid matter in suspension by filtration, adding a leaven to at least a part of the filtrate resulting from said filtration, effecting an alcoholic fermentation between 20° and 28° C. in a carbon dioxide atmosphere and recovering the product resulting from said fermentation, the improvement wherein said filtration comprises at least two successive filtration operations comprising a first filtration operation for removing solid matter in suspension of a size greater than 1 mm and a second filtration operation by microfiltration with a filtrating membrane having a porosity within the range of 0.2 to 0.4 μm thereby obtaining a sterile alcoholic beverage having a very low non-alcohol content as well as desirable organoleptic properties.

3. In a process for obtaining alcoholic beverages from a sugar cane juice naturally containing a sufficient content of at least a fermentable sugar comprising pressing sugar cane and collecting a juice having a fermentable sugar content of between 80 to and 230 g/liter, adjusting the pH of said juice between 3.5 and 4.3, sulfiting and clarifying the resulting juice by eliminating substantially all solid matter in suspension by filtration, adding a leaven to at least a part of the filtrate resulting from said filtration, effecting an alcoholic fermentation between 20° and 28° C. in a carbon dioxide atmosphere and recovering the product resulting from said fermentation, the improvement wherein said filtration comprises at least two successive filtration operations comprising a first filtration operation for removing solid matter in suspension of a size greater than 1 mm and a second filtration operation by microfiltration with a filtrating membrane having a porosity within the range of 0.2 to 0.4 μm thereby obtaining a sterile alcoholic base cane beverage having a very low non-alcohol content as well as desirable organoleptic properties.

4. The process according to claim 1, wherein the filtrate resulting from said second filtration operation is recovered and divided into two parts, a major part and a minor part, said minor part being used for forming said leaven by aerobic culturing of a selected yeast and the resulting leaven is added to said major part before effecting said alcoholic fermentation between 20° and 28° C. in a carbon dioxide atmosphere in a sealed or closed tank, said addition being made when the concentration in yeast of said leaven is between $10^7$ and $10^8$ yeast cells per cm3 and the population of said yeast cells is in the growth phase, the volume of said added leaven representing 10 to 25% of said major part of said filtrate.

5. The process according to claim 2, wherein the filtrate resulting from said second filtration operation is recovered and divided into two parts, a major part and a minor part, said minor part being used for forming said leaven by aerobic culturing of a selected yeast and the resulting leaven is added to said major part before effecting said alcoholic fermentation between 20° and 28° C. in a carbon dioxide atmosphere in a sealed or closed tank, said addition being made when the concentration in yeast of said leaven is between $10^7$ and $10^8$ yeast cells per cm3 and the population of said yeast cells is in the growth phase, the volume of said added leaven representing 10 to 25% said major part of said filtrate.

6. The process according to claim 3, wherein the filtrate resulting from said second filtration operation is recovered and divided into two parts, a major part and a minor part, said minor part being used for forming said leaven by aerobic culturing of a selected yeast and the resulting leaven is added to said major part before effecting said alcoholic fermentation between 20° and 28° C. in a carbon dioxide atmosphere in a sealed or closed tank, said addition being made when the concentration in yeast of said leaven is between $10^7$ and $10^8$ yeast cells per cm3 and the population of said yeast cells is in the growth phase, the volume of said added leaven representing 10 to 25% of said major part of said filtrate.

7. The process according to claim 4, wherein said selected yeast is *Saccharomyces cerevisiae*.

8. The process according to claim 5, wherein said selected yeast is *Saccharomyces cerevisiae*.

9. The process according to claim 6, wherein said selected yeast is *Saccharomyces cerevisiae*.

10. The process according to claim 1, wherein said alcoholic fermentation is conducted up to a desired alcohol content comprised between 2% ethanol by volume and the alcohol content corresponding to the natural completion of said alcoholic fermentation.

11. The process according to claim 2, wherein said alcoholic fermentation is conducted up to a desired alcohol content comprised between 2% ethanol by volume and the alcohol content corresponding to the natural completion of said alcoholic fermentation.

12. The process according to claim 3, wherein said alcoholic fermentation is conducted up to a desired alcohol content comprised between 2% ethanol by volume and the alcohol content corresponding to the natural completion of said alcoholic fermentation.

13. The process according to claim 1, wherein said sterile alcoholic beverage is further distilled to obtain a distillate having an alcoholic content from 94 to 96 vol. %.

14. The process according to claim 2, wherein said sterile alcoholic beverage is further distilled to obtain a distillate having an alcoholic content from 94 to 96 vol. %.

15. The process according to claim 3, wherein said sterile alcoholic beverage is further distilled to obtain a distillate having an alcoholic content from 94 to 96 vol. %.

* * * * *